(12) United States Patent
Kim (10) Patent No.: US 12,203,860 B2
(45) Date of Patent: Jan. 21, 2025

(54) BIOSENSOR DEVICE

(71) Applicant: Electronics and Telecommunications Research Institute, Daejeon (KR)

(72) Inventor: Jin Tae Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 256 days.

(21) Appl. No.: 17/875,858

(22) Filed: Jul. 28, 2022

(65) Prior Publication Data

US 2023/0104161 A1    Apr. 6, 2023

(30) Foreign Application Priority Data

Oct. 5, 2021 (KR) .................. 10-2021-0131923
May 27, 2022 (KR) .................. 10-2022-0065243

(51) Int. Cl.
*G02B 1/00* (2006.01)
*G01N 21/41* (2006.01)
(Continued)

(52) U.S. Cl.
CPC .......... *G01N 21/6486* (2013.01); *G01N 21/41* (2013.01); *G02B 1/002* (2013.01);
(Continued)

(58) Field of Classification Search
CPC .... G01N 21/6486; G01N 21/03; G01N 21/21; G01N 21/25; G01N 21/41;
(Continued)

(56) References Cited

U.S. PATENT DOCUMENTS 7,422,891 B2 * 9/2008 Cunningham ....... G02B 5/1809
 436/527
8,467,061 B2 * 6/2013 McCaffrey ......... G01N 21/6428
 422/82.11

(Continued)

FOREIGN PATENT DOCUMENTS

| JP | 2015-524554 A | 8/2015 |
| JP | 2015-200745 A | 11/2015 |
| JP | 2019-184314 A | 10/2019 |

OTHER PUBLICATIONS

Zhou et al Label-free terahertz microfluidic biosensor for sensitive DNA detection using graphene-metasurface hybrid structures, Biosensors and Bioelectronics, vol. 188, 2021, 113336, ISSN 0956-5663, https://doi.org/10.1016/j.bios.2021.113336 (Year: 2021).*

(Continued)

*Primary Examiner* — Uzma Alam
*Assistant Examiner* — Jonathon Cook
(74) *Attorney, Agent, or Firm* — NSIP Law (57) ABSTRACT

Provided is a biosensor device. The biosensor device includes a light source configured to generate source light, a photodetector configured to detect the source light, and a sample box accommodating a biomaterial that receives the source light to generate structured light beam from the source light. The sample box may include a substrate, a spacer on an edge of the substrate, a cover plate on the spacer, and a lower metamaterial pattern disposed on a top surface of the substrate.

15 Claims, 5 Drawing Sheets

(51) Int. Cl.
  *G01N 21/64* (2006.01)
  *G02B 5/30* (2006.01)
  *G01J 9/02* (2006.01)
(52) U.S. Cl.
  CPC .............. *G02B 5/3041* (2013.01); *G01J 9/02* (2013.01); *G01J 2009/0261* (2013.01); *G01N 2021/6471* (2013.01); *G01N 2201/0683* (2013.01); *G02B 2207/101* (2013.01)
(58) Field of Classification Search
  CPC ... G01N 2021/6471; G01N 2021/1765; G01N 2201/0683; G01N 33/543; G02B 1/002; G02B 2207/101; G02B 5/3041; G02F 2202/30; G01J 9/02; G01J 9/0246; G01J 2009/0261
  See application file for complete search history.

(56) References Cited

U.S. PATENT DOCUMENTS

| | | | |
|---|---|---|---|
| 10,161,857 B2 | 12/2018 | Nomoto | |
| 10,261,014 B2 | 4/2019 | Sapiens et al. | |
| 10,625,261 B2 | 4/2020 | Williams et al. | |
| 2009/0270275 A1 | 10/2009 | Park et al. | |
| 2010/0096563 A1* | 4/2010 | Ponjee | G01N 21/0303 250/459.1 |
| 2010/0201982 A1 | 8/2010 | Moriya | |
| 2010/0264428 A1 | 10/2010 | Huh et al. | |
| 2014/0134714 A1* | 5/2014 | Valsesia | G01N 21/554 422/69 |
| 2015/0198524 A1* | 7/2015 | Sapiens | G02B 27/56 356/445 |
| 2015/0253525 A1* | 9/2015 | Hong | G01N 21/6458 250/366 |
| 2018/0042511 A1* | 2/2018 | Atanackovic | H01L 31/02327 |
| 2020/0116729 A1 | 4/2020 | Irudayaraj | |
| 2021/0348969 A1* | 11/2021 | Yao | G02B 5/201 |
| 2022/0120684 A1* | 4/2022 | Emadi | G01N 21/645 |

OTHER PUBLICATIONS

A. Leitis, M. L. Tseng, A. John-Herpin, Y. S. Kivshar, H. Altug, Wafer-Scale Functional Metasurfaces for Mid-Infrared Photonics and Biosensing. Adv. Mater. 2021, 33, 2102232. https://doi.org/10.1002/adma.202102232 (Year: 2021).*

Wang et al An optofluidic metasurface for lateral flow-through detection of breast cancer biomarker, Biosensors and Bioelectronics, vol. 107, 2018, pp. 224-229, ISSN 0956-5663, https://doi.org/10.1016/j.bios.2018.02.038 (Year: 2018).*

Tabassum S, Nayemuzzaman SK, Kala M, Kumar Mishra A, Mishra SK. Metasurfaces for Sensing Applications: Gas, Bio and Chemical. Sensors (Basel). Sep. 13, 2022;22(18):6896. doi: 10.3390/s22186896. PMID: 36146243; PMCID: PMC9504383. (Year: 2022).*

D. Hasan, C. Lee, Adv. Sci. 2018, 5, 1700581. https://doi.org/10.1002/advs.482 (Year: 2018).*

Emaminejad, H., Mir, A. & Farmani, A. Design and Simulation of a Novel Tunable Terahertz Biosensor Based on Metamaterials for Simultaneous Monitoring of Blood and Urine Components. Plasmonics 16, 1537-1548 (2021). https://doi.org/10.1007/s11468-021-01399-5 (Year: 2021).*

Flanagan, M. T., et al. "Surface plasmon resonance and immunosensors." *Electronics Letters* vol. 23. Issue 20 (1984). pp. 968-970.

* cited by examiner

BIOSENSOR DEVICE

CROSS-REFERENCE TO RELATED APPLICATIONS

This U.S. non-provisional patent application claims priority under 35 U.S.C. § 119 of Korean Patent Application Nos. 10-2021-0131923, filed on Oct. 5, 2021, and 10-2022-0065243, filed on May 27, 2022, the entire contents of which are hereby incorporated by reference.

BACKGROUND

The present disclosure herein relates to a biosensor device.

In recent years, due to social, cultural and economic factors, the spread and prevalence of high-risk infectious diseases, the onset of malignant tumors, and the occurrence of various types of cancer are causing enormous national, social and economic losses. There is an increasing need to develop a technology for rapidly and accurately reading pathogens such as high-risk viruses and bacteria.

SUMMARY

The present disclosure provides a biosensor device capable of improving detection efficiency of a biomaterial.

An embodiment of the inventive concept provides a biosensor device. The biosensor device includes: a light source configured to generate source light; a photodetector configured to detect the source light; and a sample box accommodating a biomaterial that receives the source light to generate structured light beam from the source light. The sample box may include: a substrate; a spacer on an edge of the substrate; a cover plate on the spacer; and a lower metamaterial pattern disposed on a top surface of the substrate.

In an embodiment, the sample box may further include an upper metamaterial pattern facing the lower metamaterial pattern and provided on a bottom surface of the cover plate.

In an embodiment, each of the lower metamaterial pattern and the upper metamaterial pattern may have a width or interval of about 10 nanometers to about 400 nanometers.

In an embodiment, each of the lower metamaterial pattern and the upper metamaterial pattern may have a stacked structure of a metal and a dielectric.

In an embodiment, the sample box may further include a lower polarization pattern provided on a bottom surface of the substrate.

In an embodiment, the sample box may further include a lower lattice pattern disposed in the substrate between the lower metamaterial pattern and the lower polarization pattern.

In an embodiment, the sample box may further include an upper polarization pattern provided on a top surface of the cover plate.

In an embodiment, each of the lower polarization pattern and the upper polarization pattern may have a width or interval of about 700 nanometers to about 100 nanometers.

In an embodiment, the sample box may further include an upper lattice pattern disposed in the cover plate between the upper polarization pattern and the upper meta-material pattern.

In an embodiment, each of the lower lattice pattern and the upper lattice pattern may have a width or interval of about 400 nanometers to about 700 nanometers.

In an embodiment of the inventive concept, a biosensor device includes: a light source configured to generate source light; a photodetector configured to detect the source light; and a sample box accommodating a biomaterial that receives the source light to generate structured light beam from the source light, The sample box may include: a substrate; a lower metamaterial pattern on a top surface of the substrate; a spacer disposed around the lower metamaterial pattern and provided on an edge of the substrate; a cover plate configured to cover the lower metamaterial pattern and provided on the spacer; and an upper metamaterial pattern facing the lower metamaterial pattern and provided on a bottom surface of the cover plate.

In an embodiment, the sample box may further include: a lower polarization pattern on a bottom surface of the substrate; and an upper polarization pattern on a top surface of the cover plate.

In an embodiment, the sample box may further include: a lower lattice pattern disposed in the substrate between the lower polarization pattern and the lower metamaterial pattern; and an upper lattice pattern disposed in the cover plate between the upper polarization pattern and the upper metamaterial pattern.

In an embodiment, the lower lattice pattern may be less than the lower polarization pattern and greater than the lower metamaterial pattern, and the upper lattice pattern may be less than the upper polarization pattern and greater than the upper metamaterial pattern.

In an embodiment, the lower lattice pattern may be arranged in a direction crossing the upper lattice pattern, the lower metamaterial pattern may be aligned with the upper metamaterial pattern, and the lower lattice pattern may be aligned with the upper lattice pattern.

In an embodiment of the inventive concept, a biosensor device includes: a light source configured to generate source light; a photodetector configured to detect the source light; and a sample box accommodating a biomaterial that receives the source light to generate structured light beam from the source light. The sample box may include: a substrate; a lower polarization pattern on a bottom surface of the substrate; a lower metamaterial pattern on a top surface of the substrate; a lower lattice pattern disposed in the substrate between the lower metamaterial pattern and the lower polarization pattern; a spacer disposed around the lower metamaterial pattern and provided on an edge of the substrate; a cover plate configured to cover the lower metamaterial pattern and provided on the spacer; an upper metamaterial pattern on a bottom surface of the cover plate; an upper polarization pattern on a top surface of the cover plate; and an upper lattice pattern disposed in the cover plate between the upper polarization pattern and the upper metamaterial pattern.

In an embodiment, the lower lattice pattern may be less than the lower polarization pattern and greater than the lower metamaterial pattern, and the upper lattice pattern may be less than the upper polarization pattern and greater than the upper metamaterial pattern.

In an embodiment, each of the lower polarization pattern and the upper polarization pattern may include ITO.

In an embodiment, each of the lower metamaterial pattern and the upper metamaterial pattern may have a stacked structure of a metal and a dielectric.

In an embodiment, each of the lower lattice pattern and the upper lattice pattern may include defects or a semiconductor in the substrate or the cover plate.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Embodiments of the present invention will be described in detail with reference to the accompanying drawings. Advantages and features of the present invention, and implementation methods thereof will be clarified through following embodiments described with reference to the accompanying drawings. The present invention may, however, be embodied in different forms and should not be construed as limited to the embodiments set forth herein. Rather, the embodiments introduced herein are provided so that the disclosed contents may be thorough and complete, and the spirit of the present invention may be sufficiently conveyed to those skilled in the art, and the present invention is only defined by the scope of the claims. Like reference numerals refer to like elements throughout.

In the following description, the technical terms are used only for explaining a specific embodiment while not limiting the present invention. In this specification, the terms of a singular form may comprise plural forms unless specifically mentioned. The meaning of 'comprises' and/or 'comprising' specifies a component, a step, an operation and/or an element does not exclude other components, steps, operations and/or elements. In addition, in the specification, light beam, polarization, metamaterial, and fluorescence may be understood as meanings mainly used in the fields of optics and biotechnology. Since it is according to a preferred embodiment, reference numerals presented in the order of description are not necessarily limited to the order.

Figure 1:
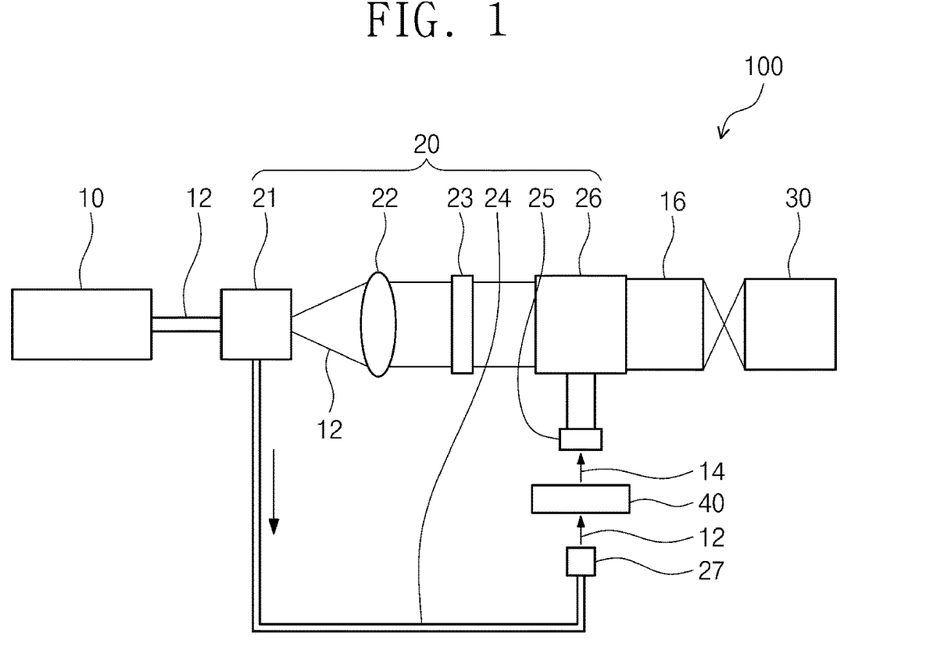
FIG. 1 is a cross-sectional view illustrating an example of a biosensor device 100 according to an embodiment of the inventive concept.

FIG. 1 is a cross-sectional view illustrating an example of a biosensor device 100 according to an embodiment of the inventive concept.

Referring to FIG. 1, the biosensor device 100 according to an embodiment of the inventive concept may include a light source 10, an optical system 20, a photodetector 30, and a sample box 40.

The light source 10 may generate source light 12. The source light 12 may include visible light having a wavelength between about 400 nm and about 700 nm. Alternatively, the source light 12 may include ultraviolet or infrared light, but an embodiment of the inventive concept is not limited thereto.

The optical system 20 may receive the source light 12 to provide the source light 12 to the sample box 40 and the photodetector 30. For example, the optical system 20 may include an optical splitter 21, a first lens 22, an optical block 23, an optical fiber 24, a second lens 25, and a beam splitter 26.

The optical splitter 21 may be provided adjacent to the light source 10. The optical splitter 21 may provide a portion of the source light 12 to the first lens 22 and provide a remaining portion to the optical fiber 24. For example, the optical splitter 21 may include an optical coupler or a half mirror, but an embodiment of the inventive concept is not limited thereto.

The first lens 22 may be provided adjacent to the optical splitter 21. The first lens 22 may collimate the source light 12. The first lens 22 may include a convex lens.

An optical block 23 may be provided between the first lens 22 and the beam splitter 26. The optical block 23 may switch the source light 12 transmitted to the beam splitter 26 and the photodetector 30. When the optical block 23 is removed between the first lens 22 and the beam splitter 26, the source light 12 may be provided to the beam splitter 26 and the photodetector 30. If the optical block 23 is provided between the first lens 22 and the beam splitter 26, the source light 12 may be blocked so as not to reach the beam splitter 26 and the photodetector 30. For example, the optical block 23 may include a black block. Alternatively, the optical block 23 may include quartz or glass. Furthermore, the optical block 23 may include a phase difference block or a color filter block, but an embodiment of the inventive concept is not limited thereto.

The optical fiber 24 may be provided between the optical splitter 21 and the sample box 40. The optical fiber 24 may provide the source light 12 to the sample box 40. The optical fiber 24 may include a single-mode optical fiber or a multi-mode optical fiber, but an embodiment of the inventive concept is not limited thereto.

An output terminal 27 may be provided between the optical fiber 24 and the second lens 25. The output terminal 27 may provide the source light 12 to the sample box 40 to produce structured light beam 14.

The second lens 25 may receive the structured light beam 14 to provide the structured light beam 14 to the beam splitter 26.

The beam splitter 26 may be provided between the optical block 23 and the photodetector 30. The beam splitter 26 may be provided between the second lens 25 and the photodetector 30. The beam splitter 26 may transmit the source light 12 and the structured light beam 14 to photodetector 30. The source light 12 and the structured light beam 14 may interfere within beam splitter 26 to produce interference light 16. Alternatively, the structured light beam 14 may be provided to the photodetector 30 without the interference, but an embodiment of the inventive concept is not limited thereto.

The photodetector 30 may be provided adjacent to the beam splitter 26. The photodetector 30 may receive the source light 12 and the structured light beam 14. The photodetector 30 may detect the interference light 16. The photodetector 30 may include a CCD sensor or a CMOS sensor. Alternatively, the photodetector 30 may include a photodiode, but an embodiment of the inventive concept is not limited thereto.

The sample box 40 may be provided between the optical fiber 24 and the second lens 25. The sample box 40 may receive the source light 12 to generate the structured light beam 14. The structured light beam 14 may include Gaussian beam, propagation-invariant beam, Hermite-Gaussian (HG) beam, Bessel beam, Laguerre-Gaussian (LG) beam, Hermite-Laguerre-Gaussian beam, Ince-Gaussian (IG) beam, Mathieu beam, or Airy beam. Among them, the Laguerre-Gaussian beam may have helical phase fronts.

Figure 2:
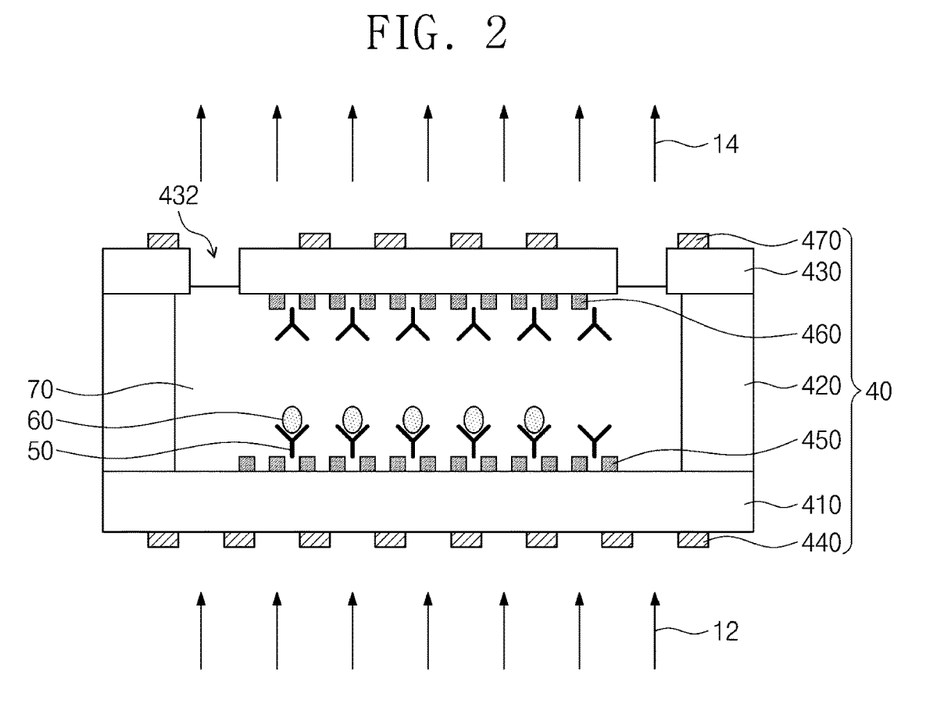
FIG. 2 is a cross-sectional view illustrating an example of a sample box of FIG. 1.

FIG. 2 is a cross-sectional view illustrating an example of the sample box of FIG. 1.

Referring to FIG. 2, the sample box 40 may generate structured light 12 using the source light 12. According to an example, the sample box 40 includes a substrate 410, a spacer 420, a cover plate 430, a lower polarization pattern 440, a lower metamaterial pattern 450, an upper metamaterial pattern 460, and an upper polarization pattern 470.

The substrate 410 may be provided between the lower polarization pattern 440 and the lower metamaterial pattern 450. The substrate 410 may transmit the source light 12. The substrate 410 may include quartz, glass, or transparent plastic.

The spacer 420 may be provided between the substrate 410 and the cover plate 430. The spacer 420 may extend along an edge of the substrate 410. The substrate 410 and the spacer 420 may store a biomaterial 60 and a biomaterial receptor 50. The spacer 420 may include quartz, glass, or plastic.

The cover plate 430 may be provided on the spacer 420. The cover plate 430 may transmit the structured light beam 14. The cover plate 430 may include quartz, glass, or plastic. The cover plate 430 may have solution input holes 432. The solution input holes 432 may be disposed at both edges of the cover plate 430. The solution 70, the biomaterial receptors 50, and the biomaterials 60 may be provided between the substrate 410 and the cover plate 430 through the solution input holes 432.

The lower polarization pattern 440 may be disposed on a bottom surface of the substrate 410. The lower polarization pattern 440 may have a width and/or an interval greater than a wavelength of visible light. For example, the polarization pattern 440 may have a width or interval of about 700 nm to about 100 μm. The lower polarization pattern 440 may acquire linearly polarized light or spirally polarized light of the source light 12. The lower polarization pattern 440 may include ITO. Alternatively, the lower polarization pattern 440 may include a metal such as ZnO or aluminum, but an embodiment of the inventive concept is not limited thereto.

The lower metamaterial pattern 450 may be disposed on a top surface of the substrate 410. The lower metamaterial pattern 450 may have a width or interval that is less or narrower than the width or interval of the lower polarization pattern 440. The lower metamaterial pattern 450 may have a width or interval of about 10 nm to about 400 nm. The lower metamaterial pattern 450 may acquire a negative refractive index of the source light 12. Alternatively, the lower metamaterial pattern 450 may use the source light 12 to generate the structured light beam 14. For example, the lower metamaterial pattern 450 may have a stacked structure of a metal and a dielectric.

The biomaterial receptors 50 may be individually provided between the lower metamaterial patterns 450. Each of the biomaterial receptors 50 may have a Y-shape. Each of the biomaterial receptors 50 may accommodate the biomaterial 60.

The biomaterials 60 may be individually provided on the biomaterial receptors 50. The biomaterials 60 may allow a phase or wavelength of the structured light beam 14 to vary based on their intrinsic properties. The biomaterials 60 may include cells, viruses, or DNA, but an embodiment of the inventive concept is not limited thereto.

The biomaterial receptors 50 and the biomaterials 60 may be provided in a solution 70. The solution 70 may include deionized water or a transparent fluid such as ethylene glycol. In addition, the solution 70 may include alcohol or acetone, but an embodiment of the inventive concept is not limited thereto.

The upper metamaterial pattern 460 may be disposed on a bottom surface of the cover plate 430. The upper metamaterial pattern 460 may be aligned with the lower metamaterial pattern 450. The upper metamaterial pattern 460 may have the same width or interval as that of the lower metamaterial pattern 450. The upper metamaterial pattern 460 may have a width or interval of about 10 nm to about 400 nm. The upper metamaterial pattern 460 may allow the structured light beam 14 to pass therethrough and may remove noise (e.g., fluorescence). For example, the upper metamaterial pattern 460 may have a stacked structure of a metal and a dielectric.

The upper polarization pattern 470 may be disposed on a top surface of the cover plate 430. The upper polarization pattern 470 may be similar to the lower polarization pattern 440. The upper polarization pattern 470 may have a width and/or an interval greater than a wavelength of visible light. For example, the polarization pattern 440 may have a width or interval of about 700 nm to about 100 μm. The lower polarization pattern 440 may acquire linearly or helically polarized light of the source light 12 or the structured light beam 14. The lower polarization pattern 440 may include ITO.

A controller (not shown) may determine the type and/or amount of biomaterials 60 by using a detection signal of the structured light beam 14 acquired from the photodetector 30. The structured light beam 14 may have a phase, a polarization, and a wavelength that are changed depending on the presence or absence of the biomaterials 60. The structured light beam 14 may have a spiral-shaped three-dimensional structure. The three-dimensional structure of the structured light beam 14 may be slightly changed by the biomaterials 60. The three-dimensional structure of the structured light beam 14 may be slightly changed by the biomaterials 60.

Figure 3:
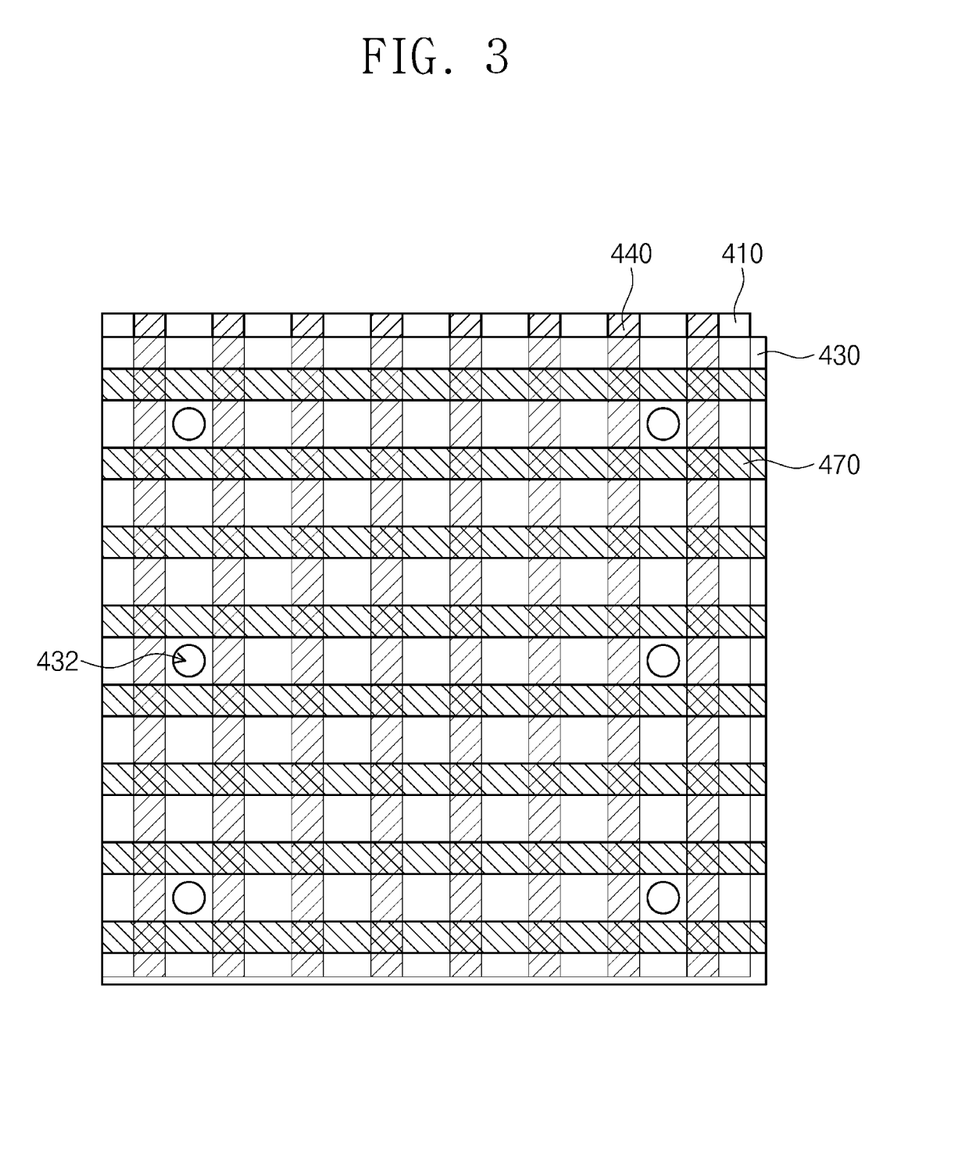
FIG. 3 is a plan view illustrating a lower polarization pattern and an upper polarization pattern of FIG. 2.

FIG. 3 is a plan view illustrating the lower polarization pattern 440 and the upper polarization pattern 470 of FIG. 2.

Referring to FIG. 3, the lower polarization pattern 440 and the upper polarization pattern 470 may extend in different directions. The lower polarization pattern 440 and the upper polarization pattern 470 may be arranged in directions crossing each other in a plan view. The lower polarization pattern 440 and the upper polarization pattern 470 may be perpendicular to each other. The solution input holes 432 may be disposed at an edge of the cover plate 430. Each of the solution input holes 432 may have a circular shape in the plan view.

Figure 4:
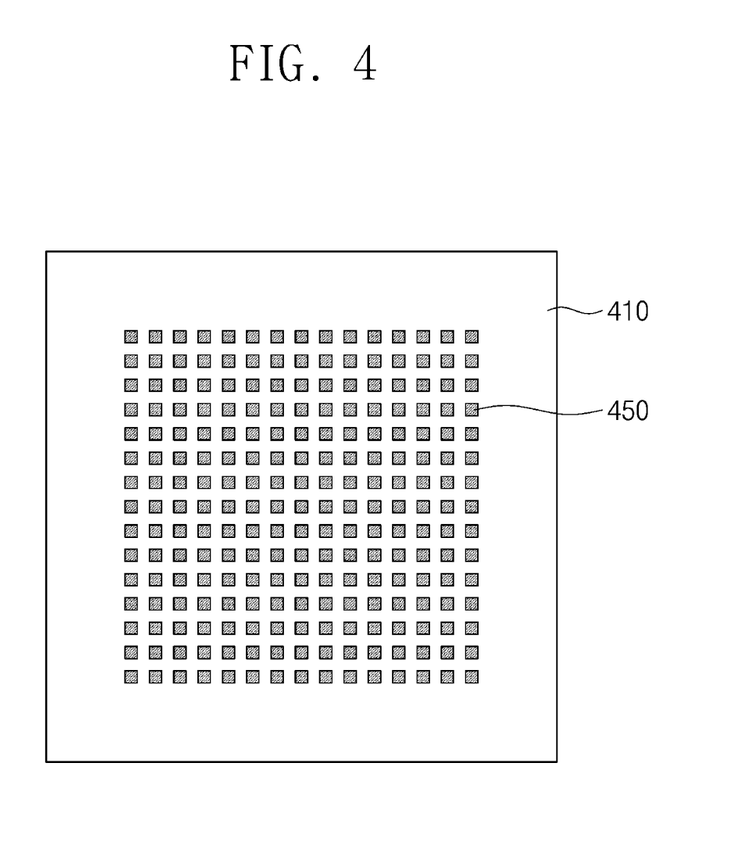
FIG. 4 is a plan view illustrating an example of a lower metamaterial pattern of FIG. 2.

FIG. 4 is a plan view illustrating an example of the lower metamaterial pattern 450 of FIG. 2.

Referring to FIG. 4, each of the lower metamaterial patterns 450 may have a square shape. The lower metamaterial patterns 450 may be arranged at equal intervals in the plan view.

Although not shown, the upper metamaterial pattern 460 may have the same shape as the lower metamaterial pattern 450.

Figure 5:
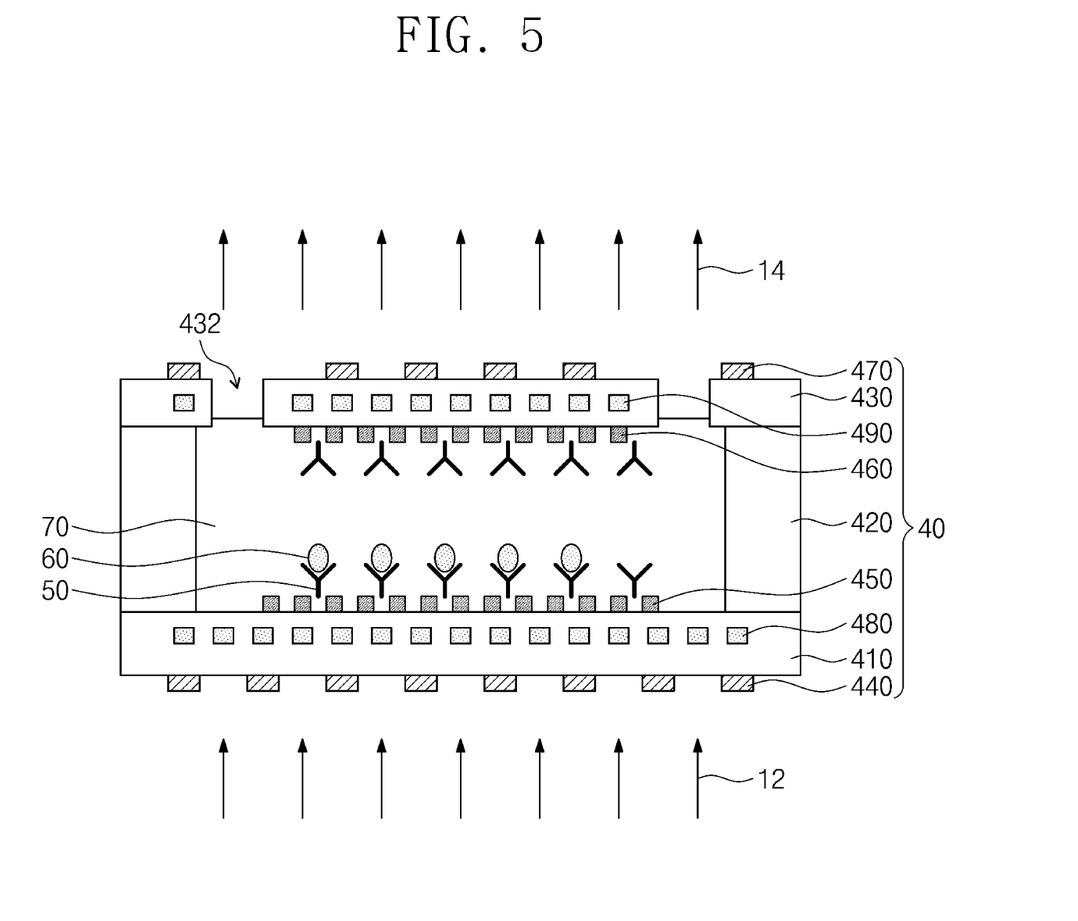
FIG. 5 is a cross-sectional view illustrating an example of the sample box of FIG. 1.

FIG. 5 is a cross-sectional view illustrating an example of the sample box of FIG. 1.

Referring to FIG. 5, the sample box 40 may further include a lower lattice pattern 480 and an upper lattice pattern 490. The substrate 410, the spacer 420, the cover plate 430, the lower polarization pattern 440, the lower metamaterial pattern 450, the upper metamaterial pattern 460, and the upper polarization pattern 470 may be configured in the same manner as those of FIG. 2.

The lower lattice pattern 480 may be disposed between the lower polarization pattern 440 and the lower metamaterial pattern 450. The lower lattice pattern 480 may be disposed in the substrate 410. The lower lattice pattern 480 may include defects in the substrate 410. Alternatively, the lower lattice pattern 480 may include the group III-V semiconductor such as InGaAsP. The lower lattice pattern 480 may be less than the lower polarization pattern 440 and larger than the lower metamaterial pattern 450. The lower lattice pattern 480 may have a width or interval less than that of the lower polarization pattern 440. The width or interval of the lower lattice pattern 480 may be greater than the width or interval of the lower metamaterial pattern 450. For example, the lower grating pattern 480 may have a width or interval of about 400 nm to about 700 nm. The lower grating pattern 480 may scatter the structured light beam 14.

The upper lattice pattern 490 may be disposed between the upper metamaterial pattern 460 and the upper polarization pattern 470. The upper lattice pattern 490 may be disposed in the cover plate 430. The upper lattice pattern 490 may be aligned with the lower lattice pattern. The upper lattice pattern 490 may be the same as the lower lattice pattern 480. The upper lattice pattern 490 may include defects in the cover plate 430. The upper lattice pattern 490 may include the group III-V semiconductor such as InGaAsP. The upper lattice pattern 490 may be less than the upper polarization pattern 470 and larger than the upper metamaterial pattern 460. A width of the upper lattice pattern 490 may be less than the width of the upper polarization pattern 470 and greater than the width of the upper metamaterial pattern 460. For example, the upper grating pattern 490 may have a width or interval of about 400 nm to about 700 nm. The upper lattice pattern 490 may tune the structured light beam 14 dispersed by the lower grating pattern 480.

Figure 6:
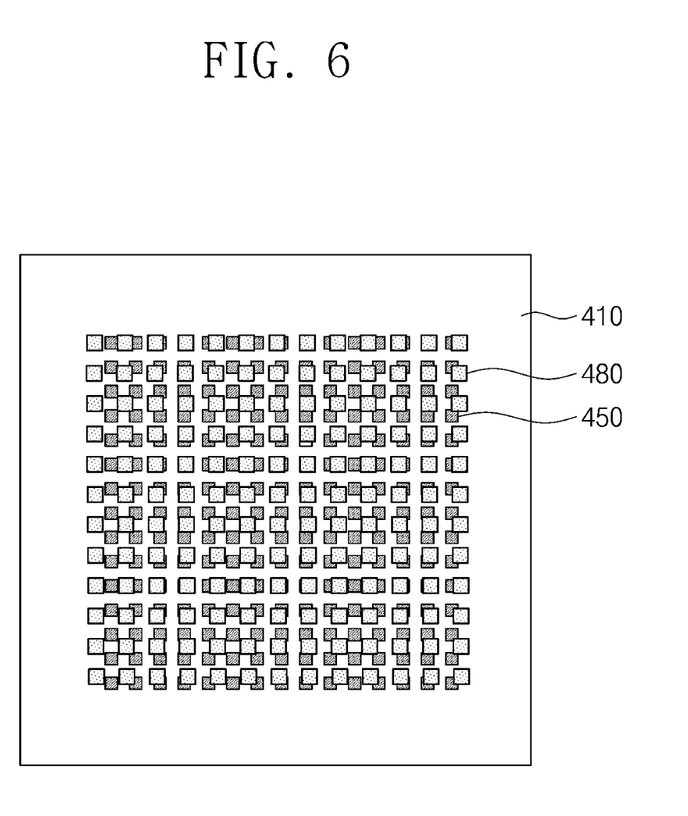
FIG. 6 is a plan view illustrating an example of a lower metamaterial pattern and a lower lattice pattern of FIG. 5.

FIG. 6 is a plan view illustrating an example of the lower metamaterial pattern and the lower lattice pattern of FIG. 5.

Referring to FIG. 6, the lower lattice pattern 480 may have the same shape as that of the lower metamaterial pattern 450. For example, each of the lower lattice pattern 480 and the lower metamaterial pattern 450 may have a square shape.

Although not shown, the light source 10 may be provided under the sample box 40. The light source 10 may directly provide the source light 12 to the sample box 40. The light source 10, the sample box 40, the optical system 20, the photodetector 30, and the sample box 40 may be designed as an integral body having a stacked structure. For example, the light source 10 may include a vertical-cavity surface-emitting laser device. The light source 10 may include a substrate, an n-doped Bragg reflective layer, an active layer, a p-doped Bragg reflective layer, an isolation layer, an oxide aperture, and a p-type metal layer.

As described above, the biosensor device according to the embodiment of the inventive concept may improve the detection efficiency of the biomaterial by using the sample box having the lower metamaterial pattern and the upper metamaterial pattern.

The contents described above are specific examples for carrying out the embodiment of the inventive concept. The present disclosure will include not only the embodiments described above, but also embodiments that are changeable in design or easily changed. In addition, the present disclosure will also include technologies that are capable of being easily modified and implemented in the future using the foregoing embodiments.

What is claimed is:

1. A biosensor device comprising:
a light source configured to generate source light;
a photodetector configured to detect the source light; and
a sample box accommodating a biomaterial that receives the source light to generate structured light beam from the source light,
wherein the sample box comprises:
a substrate;
a spacer on an edge of the substrate;
a cover plate on the spacer;
a lower metamaterial pattern disposed on a top surface of the substrate;
a lower lattice pattern disposed in the substrate under the lower metamaterial pattern, the lower lattice pattern having a width and an interval wider than those of the lower metamaterial pattern; and
a lower polarization pattern provided on a bottom surface of the substrate, the lower polarization pattern having a width and an interval wider than those of the lower lattice pattern.

2. The biosensor device of claim 1, wherein the sample box further comprises an upper metamaterial pattern facing the lower metamaterial pattern and provided on a bottom surface of the cover plate.

3. The biosensor device of claim 2, wherein each of the lower metamaterial pattern and the upper metamaterial pattern has a width or interval of about 10 nanometers to about 400 nanometers.

4. The biosensor device of claim 2, wherein each of the lower metamaterial pattern and the upper metamaterial pattern has a stacked structure of a metal and a dielectric.

5. The biosensor device of claim 1, wherein the sample box further comprises an upper polarization pattern provided on a top surface of the cover plate.

6. The biosensor device of claim 5, wherein each of the lower polarization pattern and the upper polarization pattern has a width or interval of about 700 nanometers to about 100 nanometers.

7. The biosensor device of claim 5, wherein the sample box further comprises an upper lattice pattern disposed in the cover plate between the upper polarization pattern and the upper meta-material pattern.

8. The biosensor device of claim 7, wherein each of the lower lattice pattern and the upper lattice pattern has a width or interval of about 400 nanometers to about 700 nanometers.

9. A biosensor device comprising:
a light source configured to generate source light;
a photodetector configured to detect the source light; and
a sample box accommodating a biomaterial that receives the source light to generate structured light beam from the source light,
wherein the sample box comprises:
a substrate;
a lower metamaterial pattern on a top surface of the substrate;
a spacer disposed around the lower metamaterial pattern and provided on an edge of the substrate;
a cover plate configured to cover the lower metamaterial pattern and provided on the spacer;
a lower lattice pattern disposed in the substrate under the lower metamaterial pattern, the lower lattice pattern having a width and an interval wider than those of the lower metamaterial pattern;
a lower polarization pattern provided on a bottom surface of the substrate, the lower polarization pattern having a width and an interval wider than those of the lower lattice pattern; and an upper metamaterial pattern facing the lower metamaterial pattern and provided on a bottom surface of the cover plate.

10. The biosensor device of claim 9, wherein the sample box further comprises:
   a lower polarization pattern on a bottom surface of the substrate; and
   an upper polarization pattern on a top surface of the cover plate.

11. The biosensor device of claim 10, wherein the sample box further comprises:
   a lower lattice pattern disposed in the substrate between the lower polarization pattern and the lower metamaterial pattern; and
   an upper lattice pattern disposed in the cover plate between the upper polarization pattern and the upper metamaterial pattern.

12. A biosensor device comprising:
   a light source configured to generate source light;
   a photodetector configured to detect the source light; and
   a sample box accommodating a biomaterial that receives the source light to generate structured light beam from the source light,
   wherein the sample box comprises:
      a substrate;
      a lower metamaterial pattern on a top surface of the substrate;
      a lower lattice pattern disposed in the substrate under the lower metamaterial pattern, the lower lattice pattern having a width and an interval wider than those of the lower metamaterial pattern;
      a lower polarization pattern provided on a bottom surface of the substrate, the lower polarization pattern having a width and an interval wider than those of the lower lattice pattern;
      a spacer disposed around the lower metamaterial pattern and provided on an edge of the substrate;
      a cover plate configured to cover the lower metamaterial pattern and provided on the spacer;
      an upper metamaterial pattern on a bottom surface of the cover plate;
      an upper polarization pattern on a top surface of the cover plate, the upper polarization pattern having a width and an interval wider than those of the upper metamaterial pattern; and
      an upper lattice pattern disposed in the cover plate between the upper polarization pattern and the upper metamaterial pattern, the upper lattice pattern having a width and an interval wider than those of the upper metamaterial pattern, and narrower than those of upper polarization pattern.

13. The biosensor device of claim 12, wherein each of the lower polarization pattern and the upper polarization pattern comprises ITO.

14. The biosensor device of claim 12, wherein each of the lower metamaterial pattern and the upper metamaterial pattern has a stacked structure of a metal and a dielectric.

15. The biosensor device of claim 12, wherein each of the lower lattice pattern and the upper lattice pattern comprises defects or a semiconductor in the substrate or the cover plate.

* * * * *